US011678679B2

(12) United States Patent
Pibarot et al.

(10) Patent No.: US 11,678,679 B2
(45) Date of Patent: Jun. 20, 2023

(54) MEAT ANALOGUES AND MEAT ANALOGUE EXTRUSION DEVICES AND METHODS

(71) Applicant: Société des Produits Nestlé S.A., Vevey (CH)

(72) Inventors: Patrick Pibarot, Territet (CH); Christophe Joseph Etienne Schmitt, Servion (CH); Christian Sanchez, Montpellier (FR); Marie-Héléne Morel, Montpellier (FR)

(73) Assignees: SOCIÉTÉ DES PRODUITS NESTLÉ S.A., Vevey (CH); UNIVERSITE DE MONTPELLIER, Montpellier (FR); INSTITUT NATIONAL DE LA RECHERCHE AGRONOMIQUE, Paris (FR)

( * ) Notice: Subject to any disclaimer, the term of this patent is extended or adjusted under 35 U.S.C. 154(b) by 254 days.

(21) Appl. No.: 16/842,880

(22) Filed: Apr. 8, 2020

(65) Prior Publication Data
US 2020/0323238 A1    Oct. 15, 2020

Related U.S. Application Data

(60) Provisional application No. 62/831,831, filed on Apr. 10, 2019.

(51) Int. Cl.
*A23J 3/22*    (2006.01)
*A23P 10/25*    (2016.01)
(Continued)

(52) U.S. Cl.
CPC ............ *A23J 3/227* (2013.01); *A23J 3/04* (2013.01); *A23J 3/14* (2013.01); *A23L 33/115* (2016.08); *A23P 10/25* (2016.08)

(58) Field of Classification Search
CPC ......... A23K 50/40; A23K 50/48; A23J 3/227; A23J 3/04; A23J 3/14; A23J 3/26; A23L 33/115; A23L 13/42; A23L 13/52; A23L 13/67; A23P 10/25; A23P 30/20
See application file for complete search history.

(56) References Cited

U.S. PATENT DOCUMENTS 3,175,909 A * 3/1965 Elmquist ................ A23J 3/28
                                                426/802
4,029,823 A   6/1977 Bone et al.
(Continued)

FOREIGN PATENT DOCUMENTS

WO    9634539 A1    11/1996
WO    9849902 A1    11/1998
(Continued)

OTHER PUBLICATIONS

International Search Report and Written Opinion to application No. PCT/IB2020/053355 dated Jul. 29, 2020.
(Continued)

*Primary Examiner* — Donald R Spamer
*Assistant Examiner* — Jeffrey D Benson

(57) ABSTRACT

A meat analogue may include a macrostructure of connected sheared fibers oriented parallel to one another and gaps positioned between the sheared fibers. The macrostructure may include meat and may include a vegetable protein. An extrusion system may include an extruder and a die. The extrusion system may produce a meat analogue. A meat analogue may include an animal protein. The extruder may be connectable to the die. The extrusion system may be configured to direct a material including an animal protein from the extruder to the die and through a fluid path extending through the die. The die may be configured to inject a fat or a fat analogue into the material such that the fat or the fat analogue is embedded but visually distinct from
(Continued)

the material including the animal protein when the fat or the fat analogue and the material exit the die.

9 Claims, 10 Drawing Sheets
(10 of 10 Drawing Sheet(s) Filed in Color)

(51) Int. Cl.
    *A23L 33/115*     (2016.01)
    *A23J 3/04*     (2006.01)
    *A23J 3/14*     (2006.01)

(56) References Cited

U.S. PATENT DOCUMENTS

| | | | |
|---|---|---|---|
| 4,098,913 A * | 7/1978 | Baugher | A23D 9/007 426/573 |
| 4,542,686 A | 9/1985 | Bansal | |
| 5,922,392 A * | 7/1999 | Kelly | A23K 50/42 426/656 |
| 6,797,288 B2 * | 9/2004 | Monagle | A23J 3/16 426/573 |
| 2009/0208612 A1 | 8/2009 | Reiser et al. | |
| 2018/0064137 A1 * | 3/2018 | Trottet | A23J 3/14 |

FOREIGN PATENT DOCUMENTS

| | | |
|---|---|---|
| WO | 2010126563 A1 | 11/2010 |
| WO | 2015020660 A1 | 2/2015 |
| WO | 2016150834 A1 | 9/2016 |

OTHER PUBLICATIONS

Agassant, et al, Polymer Processing Extrusion Instabilities and Methods for their Elimination or Minimisation, Intern. Polymer Processing XXI, Mar. 2006, pp. 239-255.

Pettas, et al, On the origin of extrusion instabilities: Linear stability analysis of the viscoelastic die swell, Journal of Non-Newtonian Fluid Mechanics, 2015, pp. 61-77.

\* cited by examiner

MEAT ANALOGUES AND MEAT ANALOGUE EXTRUSION DEVICES AND METHODS

CROSS REFERENCE TO RELATED APPLICATIONS

This application claims priority to U.S. Provisional Application Ser. No. 62/831,831 filed Apr. 10, 2019 the disclosure of which is incorporated in its entirety herein by this reference.

TECHNICAL FIELD

The present disclosure relates generally to meat analogues containing animal protein, methods of making such analogues, meat analogue extrusion devices, and methods of using such devices. More particularly, the present disclosure further relates to meat analogues with a fibrous macrostructure and voids in the macrostructure where fat is injected into the voids.

BACKGROUND

Existing processes for manufacturing food products that have the appearance and texture of meat ("meat analogues") mainly use protein isolates in an extrusion process. However, the way that these proteins achieve fibrous or lamellar structure is not well understood, and therefore formula modification or development of new products with specific structures is difficult.

To ensure sustainable supply of proteins, reconstituted meat analogues offer an interesting alternative. However, current products are lacking the taste and texture of red meat, especially red meat such as marbled beef steak. In addition, the variety of products offered to consumers is low and the products may be perceived by consumers as too processed.

SUMMARY

When considering the structure and texture of red meat, a striking feature is the complex hierarchical and multiscale structure of the muscular tissue, which is composed by protein fibrils of actin and myosin embedded in a collagen-based connective tissue. A key structural characteristic of the protein fibrils is that they may reach several centimeters in length and are responsible for chewiness of the meat.

In addition to the muscular protein structure, red meat exhibits inclusions of fat tissue within and without the protein matrix. This complex architecture may drive the appearance of the meat as well as texture and juiciness of the meat.

Moreover, together with the protein fibrils and the fat inclusions, red meat contains globular proteins such as hemoglobin distributed within the serum contained in the network structure and several vitamins and minerals dispersed within the matrix.

When designing meat analogues to satisfy consumers, it may be beneficial to integrate all the structural, textural and nutritional aspects of red meat such as marbled meat. For example marbled meat may include the complex hierarchical and multiscale structure of the muscular tissue, the inclusions of fat tissue within the protein matrix, and the globular proteins distributed within the serum contained in the network structure.

Accordingly, Applicant surprisingly and unexpectedly developed a meat analogue that may visually achieve marbling, defined as the intermingling or dispersion of fat within the lean beef, that achieves a beef quality grade of "USDA Prime." A USDA Prime grade may given to a beef ribeye muscle at a cut surface after a beef carcass has been ribbed between the 12th and 13th ribs that has a high amount and distribution of marbling (defined as abundant or moderately abundant marbling, where beef with a low USDA grade may only have trace, slight, or is devoid of marbling).

Further in this regard, the present disclosure provides advantages and solutions to problems in existing technologies for meat analogues and meat analogue extrusion devices and methods. For example, a meat analogue may include a fibrous macrostructure comprising voids in the macrostructure where the voids are injected with a fat and/or a fat analogue. Meat analogue extrusion devices and methods of using such devices may achieve the fibrous macrostructure and inject fat into the voids of the fibrous macrostructure. In a preferred embodiment, a meat analogue comprises a parallel fibrous macrostructure where the meat analogue fibers include fibers that are substantially parallel to one another.

In an embodiment, a die may have a configuration (for example, a "coat hanger die" configuration) that may receive a protein-containing dough for high moisture extrusion at a high temperature that, after the extrusion, may form a thin slab meat analogue with meaty texture and appearance.

In an embodiment, the meat analogue can be a pet food. Insoluble particles can be added to a raw material and used to make the meat analogue, for example added as a powder, for example calcium carbonate powder. In an embodiment, the insoluble particles may be of a mineral origin (e.g., silicium, calcium carbonate, calcium and/or carbon) and/or organic origin (e.g., bone meals, vegetable fibers, ground crustacean and/or sea fish shells, and/or egg shell powders). In some embodiments, the insoluble particles can be from gelation and/or polymerization of vegetable gums and/or hydrocolloids (e.g., starch granules, pectin, cellulose, and/or derivatives).

Additionally or alternatively, the source of the insoluble particles may be micro-ground bones, cartilage from fish frame in the form of ground fresh and/or frozen materials or as meals (e.g., bone meals such as pork meal).

In an embodiment, a natural colorant and flavor component may be injected into the dough during and/or after an extrusion process. In an embodiment, one or more natural colorants such as lycopene from tomato or betaine from beetroot and/or a mixture thereof used to simulate a natural meat color of a meat analogue. For example, the meat analogue make take the form of a marbled beef steak including a red-brown coloring, steak-like shape such as ribeye or top loin, and contain regions of meat analogue visually distinct from regions of fat and/or fat analogues. In such an embodiment, the visually distinct regions comprise different formulations relative to each other (i.e., animal protein or fat).

In an embodiment, a meat analogue with organoleptic properties the same or substantially similar to animal meat cold cuts with improved taste and in mouth perception may be produced as disclosed herein. In a preferred embodiment, the meat analogue comprises a meat and/or an animal protein. In an embodiment, the meat and/or animal protein content of the meat analogue may range from above 0% to 100% by weight of the meat analogue.

In an embodiment, the raw ingredients used to form the meat analogue may include protein, protein particles (e.g., texturized vegetable proteins) and water. The particles may be insoluble particles of vegetable and mineral origin. In one embodiment, the particle may include pea hull.

Insoluble particles and particles used in this disclosure may be interchangeable, and may refer to substances that are particles, solids, and/or fibers. Insoluble particles are preferably not bone fragments or particles of any kind or size which remain from meat processing. Insoluble particles may be particles that are added to a meat emulsion, that is, the insoluble particles were not present in any of the ingredients, including the meat, for making the meat emulsion. These substances, the insoluble particles, may be characterized by at least one characteristic selected from the group consisting of a solubility in water of about 0.0001 mg/L to about 25 mg/L at 25° C., a diameter of about 0.05 μm to about 100 μm, a bulk density of about 0.5 g/cm$^3$ to about 5 g/cm$^3$, and a specific surface area of 1 m$^2$/g to 20 m$^2$/g.

In an embodiment, the meat analogue may include at least one meat selected from the group consisting of poultry, beef, pork and fish, and the at least one meat provides at least a portion of the protein. In an embodiment, the meat analogue does not include one or more of gluten, soy and cereal.

In an embodiment, a method of making a meat analogue comprises heating of a dough which comprises subjecting the dough to an extruder operating with at least one parameter selected from the group consisting of a speed of about 50 to about 100 rpm, a massic flow of about 15 kg/h to about 25 kg/h and a temperature of about 140° C. to about 250° C. The dough can be prepared in a location selected from the group consisting of (i) a mixer from which the dough can be pumped into the extruder and (ii) the extruder (e.g., by separately feeding powder and liquid into the extruder).

In an embodiment, a method of producing a meat analogue may include: mixing an animal protein, water and a particle to form a protein emulsion, wherein the emulsion comprises from about 1% to about 30% by weight of the particle having a solubility in water of about 0.0001 mg/L to about 25 mg/L at 25° C. and a median particle size of from about 0.05 μm to about 100 μm; heating the emulsion to temperature of about 80° C. to about 200° C. by subjecting the emulsion to extrusion through a short die; and cooling the heated emulsion to form the meat analogue, wherein the meat analogue comprises a fibrous and lamellar structure.

In an embodiment, the method comprises directing a dough (e.g., an extruded dough) through a die selected from the group consisting of a coat hanger die, a fish-tail die, and a combination thereof. The method may comprise maintaining a temperature of the die at about 70° C. to about 95° C. In an embodiment, method may comprise maintaining a temperature of the die at about below about the boiling temperature of water according to a temperature and a pressure in the meat analogue at the exit of the die.

In an embodiment, fibers may be organized in a die when a lateral expansion and/or contraction of a dough in a direction substantially perpendicular to the direction of flow, for example within about +/−15 degrees to the direction perpendicular to the direction of the flow through the die, creates a periodical flow instability in the die. The periodical flow instability may result in a pressure oscillation due to flow instabilities. When the properties of the pressure oscillation are maintained when the dough exits the die (when the dough may be referred to as a meat analogue), a sheared fiber and gap structure may be created in the dough and/or meat analogue.

In an embodiment, the method comprises cutting the meat analogue to form chunks. The method can comprise combining the chunks with another comestible composition to form a blended food composition, and retorting or pasteurizing the blended food composition in container.

In an embodiment, a method according to the present disclosure may include administering a meat analogue to a pet, for example a companion animal, preferably by oral administration in a pet food.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

The patent or application file contains at least one drawing executed in color. Copies of this patent or patent application publication with color drawing(s) will be provided by the Patent Office upon request and payment of the necessary fee.

DETAILED DESCRIPTION OF EXAMPLE EMBODIMENTS

Figure 1:
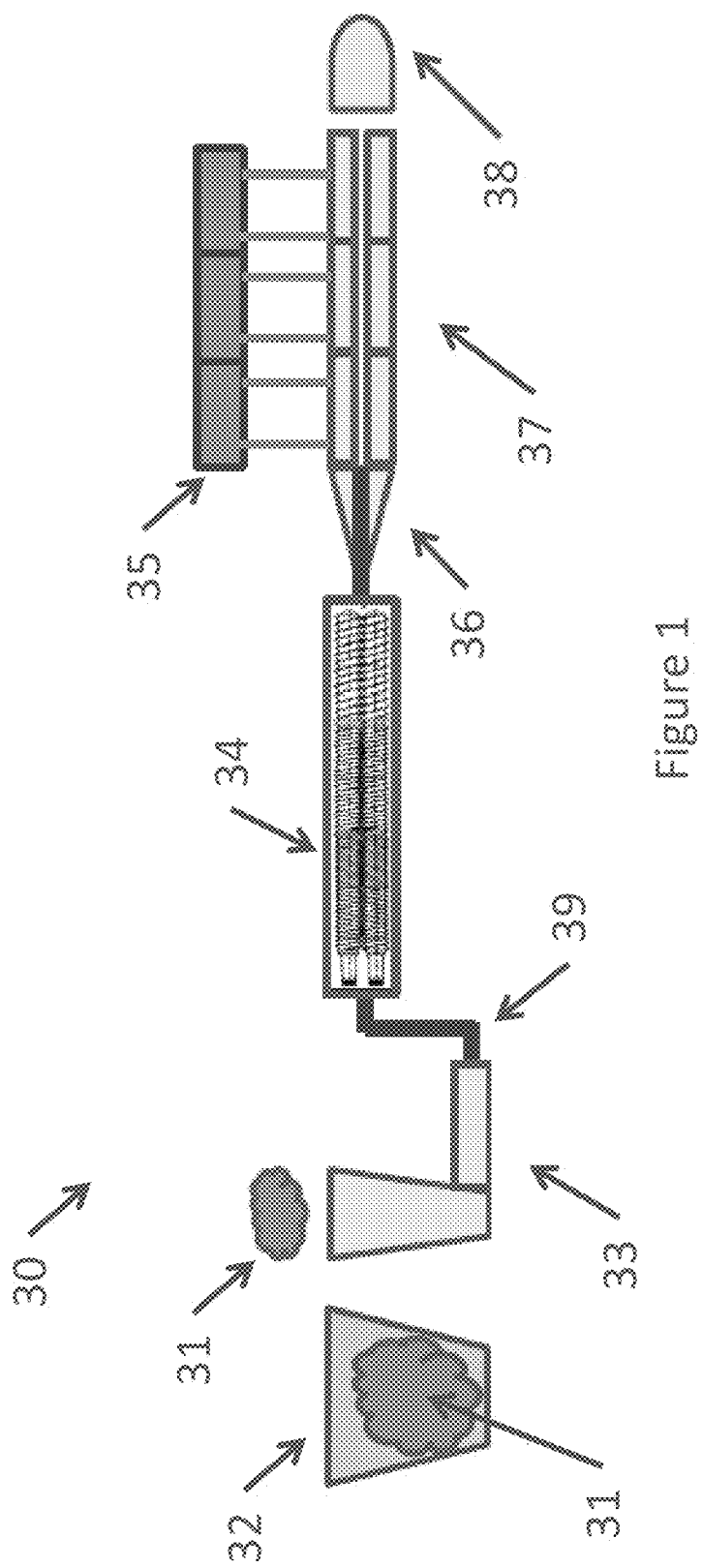
FIG. 1 illustrates an embodiment of a meat analogue extrusion system according to the present disclosure.

Detailed embodiments of products, devices and methods are disclosed herein. However, it is to be understood that the disclosed embodiments are merely exemplary of the devices and methods, which may be embodied in various forms. Therefore, specific functional details disclosed herein are not to be interpreted as limiting, but merely as a basis for the claims as a representative example for teaching one skilled in the art to variously employ the present disclosure.

As used herein, the singular forms "a," "an" and "the" include plural referents unless the context clearly dictates otherwise. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y."

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein are by weight of the total weight of the meat analogue and/or the corresponding emulsion unless expressed otherwise. When reference is made to the pH, values correspond to pH measured at 25° C. with standard equipment.

The terms "food," "food product" and "food composition" mean a product or composition that is intended for ingestion by an animal, including a human, and provides at least one nutrient to the animal. The term "pet food" means any food composition intended to be consumed by a pet. The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. The term "companion animal" means a dog or a cat.

A "blended" composition merely has at least two components having at least one different characteristic relative to each other, preferably at least moisture content and water activity in the context of the present disclosure. In this regard, description of a composition as "blended" does not imply that the blended composition has been subjected to processing sometimes referenced as "blending," namely mixing components so that they are indistinguishable from each other, and preferably such processing is avoided when mixing the meat analogue with another comestible composition (e.g., a gravy or broth) to form the blended composition disclosed herein.

A "homogenous" structure is a structure of a meat analogue that is uniformly distributed along any direction or axis of the meat analogue. For example, a homogenous structure does not have a grain direction. Conversely, a "non-homogenous" structure of a meat analogue is non-uniform along at least one direction or axis of the meat analogue. For example, a non-homogenous structure has a grain direction.

A "dry" food composition has less than 10 wt. % moisture and/or a water activity less than 0.64, preferably both. A "semi-moist" food composition has 11 wt. % to 20 wt. % moisture and/or a water activity of 0.64 to 0.75, preferably both. A "wet" food composition has more than 20 wt. % moisture and/or a water activity higher than 0.75, preferably both.

A "meat analogue" is an emulsion product that resembles one or more pieces of natural meat in appearance, texture, and physical structure. As used herein, a meat analogue includes meat such as poultry, beef, pork, fish and mixtures thereof. A meat analogue may optionally additionally include vegetable protein such as gluten to aid in the achievement of the appearance, texture, and physical structure of meat.

In the context of this document, meat analogues are preferably animal protein-based food products, which can substitute for pieces of red meat by mimicking the structure, texture, and taste of red meat. A specific feature of the meat analogues disclosed herein is the presence of a macroscopic fibrillar protein-based structure. Additionally or alternatively, meat analogues may contain a fat and/or fat analogue injected in voids within the macroscopic fibrillar protein-based structure. The fat and/or fat analogue content may range from 0% to about 100% by weight of the meat analogue. The animal protein based content may range from above 0% to 100% by weight of the meat analogue.

The preferred embodiments relate to meat analogues containing animal protein, methods of making such analogues, meat analogue extrusion devices, and methods of using such devices. More particularly, the present disclosure relates to meat analogues and meat analogue extrusion devices and methods for extruding meat analogues with a fibrous protein-gap macrostructure and/or a protein-fat macrostructure where fat is injected into the gaps within the protein-gap macrostructure.

Non-limiting examples of suitable meats for the meat analogue include poultry, beef, pork, fish and mixtures thereof.

The fibrillar meat analogue as described herein may be further used as basis to produce other meat analogues such as burger, minced meat, bacon, cold cuts, and sausages.

Figure 5:
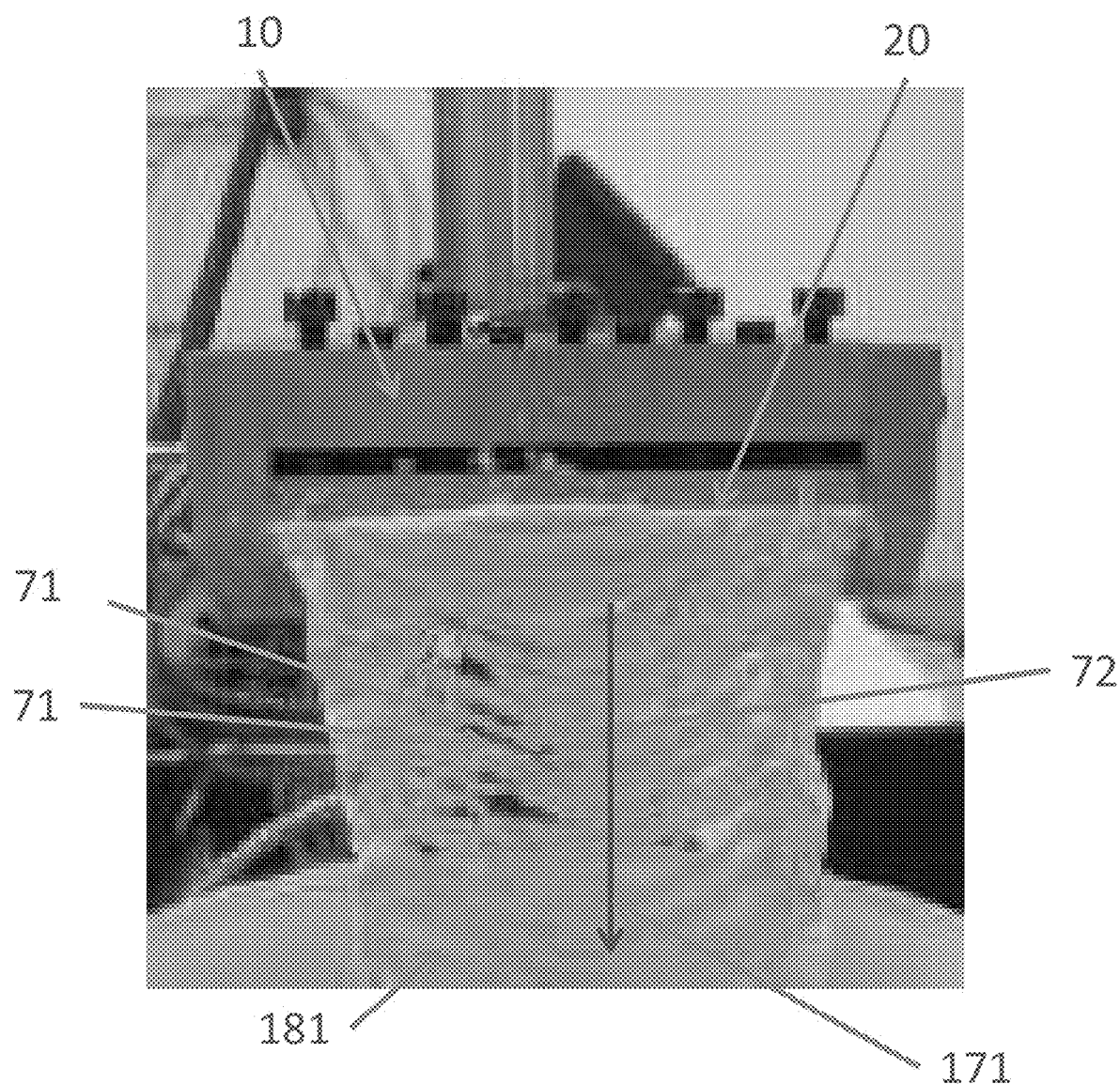
FIG. 5 illustrates an embodiment of a processed food analogue with sheared fibers according to the present disclosure.
Figure 9:
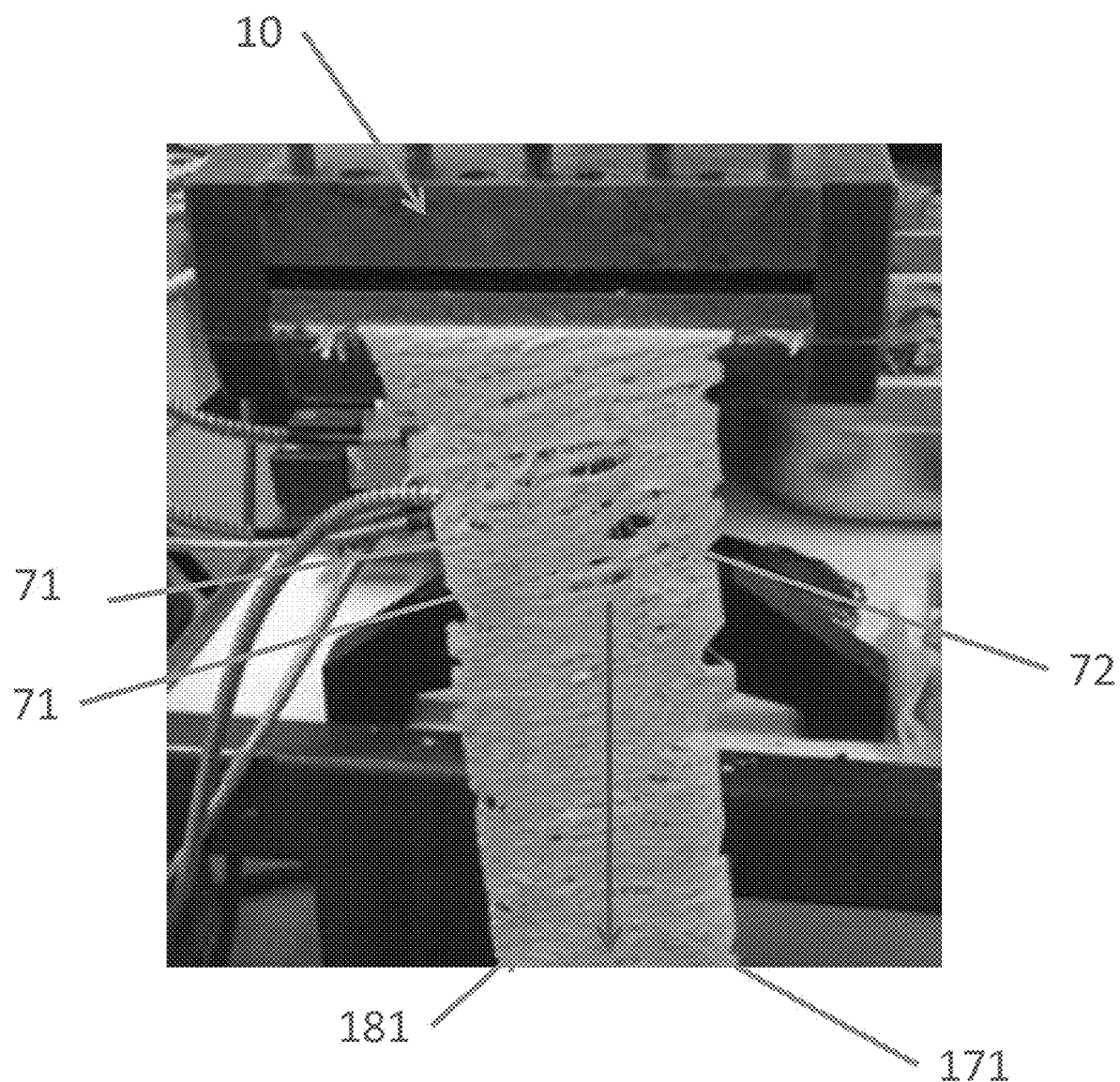
FIG. 9 illustrates an embodiment of a meat analogue with a sheared fiber and gap structure.

For example, FIGS. 5 and 9 illustrate embodiments of a die 10. The die 10 may include a line connection that directs a meat analogue into the die 10 for processing. The line connection may connected to other elements of a meat analogue production system to receive raw and/or preprocessed meat analogue for processing and/or further processing in the die 10.

The die 10 may be manufactured from a metal (i.e., aluminum, stainless steel), a plastic (i.e., Polyethylene Terephthalate, High-Density Polyethylene), an organic material (i.e., wood, bamboo), a composite (i.e., ceramic matrix composite), other material and combinations thereof. The die 10 may be manufactured through extrusion, machining, casting, 3D printing, and combinations thereof. The die 10 may be coated with a material. For example, the die 10 may be coated with a material to prevent bacterial and/or particulate buildup on the die 10.

As described herein, the die 10 may be composed of various parts or elements assembled together to form the die 10. In an embodiment, the die 10 is a single piece, for example a single piece that has been 3-D printed and/or a single piece that has been Computer Numeric Controlled ("CNC") machined from a single block of base material.

In a preferred embodiment, the meat analogue may enter the die 10 from the line connection and be extruded from the die 10. Then, the extruded meat analogue may exit the die 10 through the gap 20, as shown in FIG. 5.

When the meat analogue passes through the die 10 and is extruded, a pressure may be exerted on the meat analogue to pass the meat analogue through the die 10 thereby exerting a pressure on the die 10. In some embodiments, the die 10 may be required to withstand a pressure of about 40 psi to about 200 psi and preferably about 60 psi to about 100 psi. In an embodiment, the die 10 may be composed of multiple components held together and/or affixed using fasteners. The fasteners may be screws, snaps, bolts, clips, interlocks, and/or other fastening components.

FIG. 1 illustrates an embodiment of a meat analogue extrusion system 30 for processing the meat analogue. In an embodiment, the meat analogue is formed by a dough 31. The meat analogue extrusion system 30 may first preprocess the dough 31 at a dough preparation area 32. For example, the dough 31 may include multiple ingredients, and the multiple ingredients may require mixing prior to further processing. The mixing may be performed by hand and/or may be performed by a mechanical mixer, for example a blender.

The dough 31 may then be placed in a pump 33 of the meat analogue extrusion system 30. For example, the pump may be a piston pump. The dough 31 may be placed in the pump 33 by hand, and/or may be automatically transported from the dough preparation area 32 to the pump 33. The pump 33 may transmit the dough 31 through a line 39. The line 39 may be connected to an extruder 34. For example, the line 39 may be connected to a twin screw extruder. In an embodiment of the meat analogue extrusion system 30, the line 39 is not included, and the pump 33 is connected directly to the extruder 34.

The extruder 34 (e.g., a twin screw extruder) may apply a pressure to the dough 31 to move the dough 31 from a side of the extruder 34 with the pump 33 to an opposite side of the extruder 34. The extruder 34 may additionally or alternatively apply heat to the dough 31. The extruder 34 may additionally or alternatively be configured with an injection port (not shown) to inject water and/or another material into the dough 31 as the dough 31 moves through the extruder 34.

The extruder 34 (e.g., a twin screw extruder) may be connected to the die 10. As shown in FIG. 1, the die 10 may optionally include an inlet manifold 36, a cooling die 37, and/or one or more cooling devices 35. In other embodiments, the one or more cooling devices 35 and the inlet manifold 36 may not be included in the die 10. In other embodiments, the cooling die 37 may be a short die. A short die may be a die where the length of the die (defined as the length a material travels through the die when the die is in use) is less than the width of the die (defined as the longest dimension of a planar section of the die outlet through which the material passes when exiting the die). For example, a short die may be about 9 inches long and about 15 inches wide.

The inlet manifold 36 may receive the dough 31 at an elevated pressure from the extruder 34. The inlet manifold 36 may orient the dough 31 to pass into the cooling die 37 (e.g., a short cooling die), for example, by converting a stream of the dough 31 from a substantially circular cross section to a substantially planar cross section (i.e., with a cross sectional area where the width is many times the height, for example where the width is about 20 times the height).

The inlet manifold 36 may be connected to the cooling die 37 (e.g., a short cooling die) configured to receive the dough 31 from the inlet manifold 36. The dough 31 may then pass, as propelled by the extruder 34 (e.g., a twin screw extruder), over the cooling die 37. The cooling die 37 may be maintained at a constant temperature. Additionally or alternatively, the cooling die 37 may be maintained at a temperature profile along the path of the dough 31 as the dough 31 moves through the cooling die 37. In general, the die 10 optionally including the cooling die 37 may be held at a constant temperature between about 40° C. and about 95° C. at normal atmospheric pressure. More preferably, the die 10 may be held between about 70° C. and about 95° C. For example, the die 10 may be held at a constant temperature of about 85° C.

The cooling devices 35 may maintain a temperature of the cooling die 37 (e.g., a short cooling die). For example, the cooling die 37 may contain one or more cooling lines integrated within the cooling die 37 and connected to the one or more cooling devices 35. The one or more cooling devices 35 may include a fluid reservoir. The cooling devices 35 may direct a liquid (e.g., water, R134-a, and/or another refrigerant) through the cooling lines of the cooling die 37 to remove heat energy from the cooling die 37. The cooling die 37 may include a temperature sensor to sense the temperature of the cooling die 37. The one or more cooling devices 35 may adjust a fluid flow rate and/or a fluid temperature in reply to and/or based on feedback received from the temperature sensor. In an embodiment, multiple temperature sensors may be positioned along a flow path of the dough 31. After the extrusion, the dough 31 may be considered a meat analogue.

The meat analogue extrusion system 30 may further comprise a cutting tool 38. The cutting tool 38 may cut the dough 31 to a predetermined size and/or desired dimensions. For example, the cutting tool 38 may cut the dough 31 into strips, substantially circular forms, slices, steaks, and/or any other shape commonly associated with human and/or pet food, such as marbled beef steak.

Figure 2:
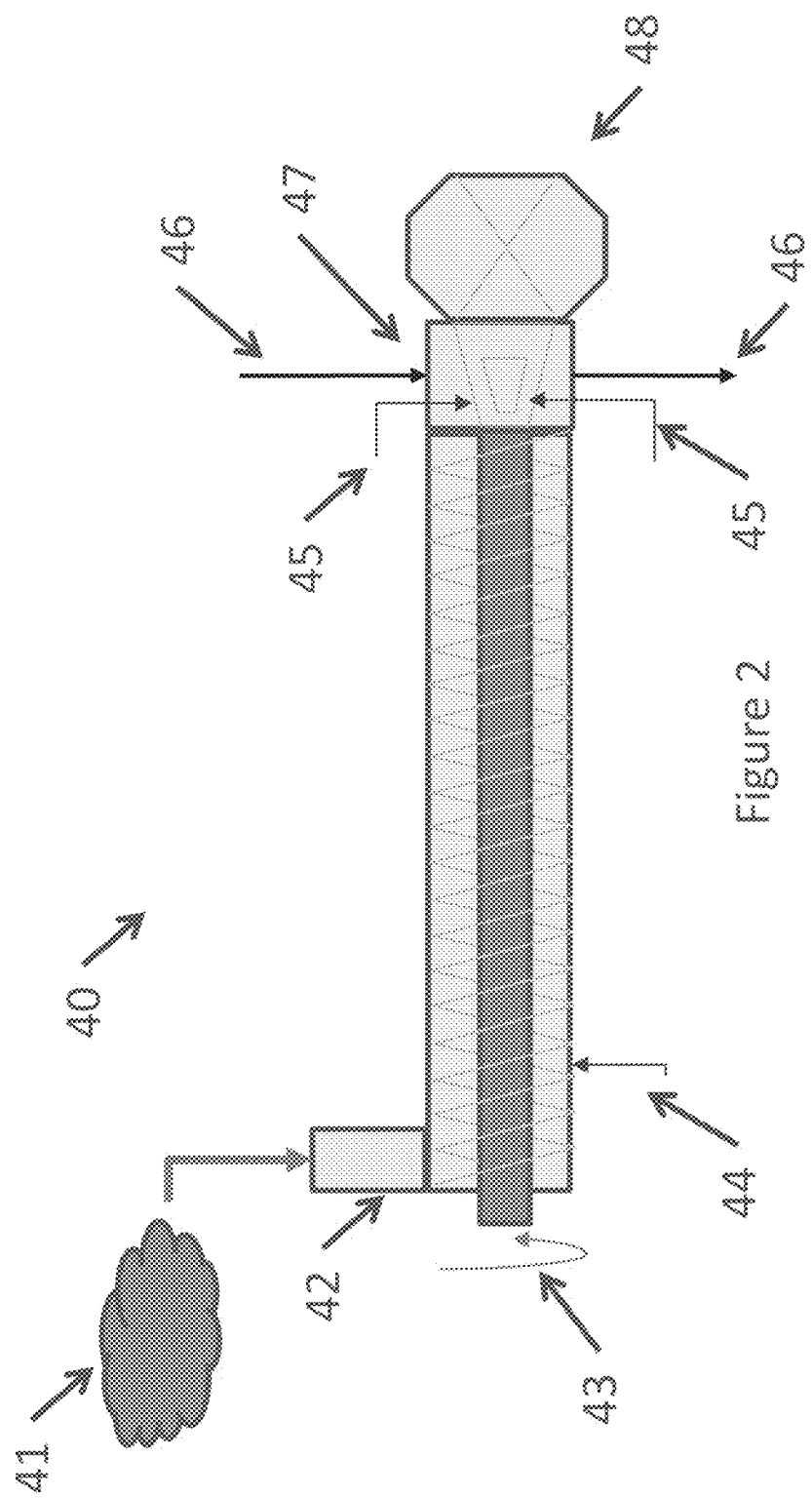
FIG. 2 illustrates a diagram depicting an embodiment of a meat analogue extrusion method according to the present disclosure.

FIG. 2 illustrates a diagram depicting an embodiment of a meat analogue extrusion method 40. For clarity, the various steps of the meat analogue extrusion method 40 have been shown as arrows in FIG. 2 on a diagram generally corresponding to the meat analogue extrusion system 30. The steps included herein have been assigned numerical identifiers, but the steps disclosed herein are not limited to being performed in the numerical order assigned by the step numbers. For example, step 46 may occur before, during and/or after step 47.

In step 41, a raw material may be introduced to the meat analogue extrusion system 30. The raw material may include a non-meat substance. The raw material may be the dough 31, the meat analogue, and/or a combination of two or more materials. Non-limiting examples of suitable non-meat protein substances include wheat protein (e.g., whole grain wheat or wheat gluten such as vital wheat gluten), corn protein (e.g., ground corn or corn gluten), soy protein (e.g., soybean meal, soy concentrate, or soy isolate), canola protein, rice protein (e.g., ground rice or rice gluten), cottonseed, peanut meal, pulse proteins (e.g. pea protein, faba bean protein), whole eggs, egg albumin, milk proteins, and mixtures thereof.

In some embodiments, the raw material comprises a non-meat protein such as gluten (e.g., wheat gluten). In some embodiments, the raw material comprises a non-meat protein that does not include gluten.

In some embodiments, the raw material may optionally contain a soy-based ingredient, a corn-based ingredient or another cereal-based ingredient (e.g., amaranth, barley, buckwheat, fonio, millet, oats, rice, wheat, rye, sorghum, triticale, or *quinoa*).

In some embodiments, the raw material may comprise pea protein and faba bean protein, or may comprise pea protein, faba bean protein, and rice, or may comprise pea protein, faba bean protein, and gluten.

The raw material may optionally comprise a flour or a protein isolate. If flour is used, the raw material may include a non-animal-meat-based protein. Therefore, an ingredient may be used that is both a vegetable protein and a flour. Non-limiting examples of a suitable flour are a starch flour, such as cereal flours, including flours from rice, wheat, corn, barley, and sorghum; root vegetable flours, including flours from potato, cassava, sweet potato, arrowroot, yam, and taro; and other flours, including sago, banana, plantain, and breadfruit flours. A further non-limiting example of a suitable flour is a legume flour, including flours from beans such as favas, lentils, mung beans, peas, chickpeas, and soybeans.

If a protein isolate is used, the raw material may include, for example, protein isolate from faba bean, lentils, or mung beans.

In some embodiments, the raw material may comprise a fat such as a vegetable fat and/or an animal fat. In some embodiment, the fat source is an animal fat source such as chicken fat, tallow, and/or grease. The fat may be used to fill voids in a processed meat analogue. The processed meat analogue may be referred to as a meat analogue matrix. A vegetable oil, such as corn oil, sunflower oil, safflower oil, rape seed oil, soy bean oil, olive oil and other oils rich in monounsaturated and polyunsaturated fatty acids, may be used. In some embodiments, a source of omega-3 fatty acids is included, such as one or more of fish oil, krill oil, flaxseed oil, walnut oil, or algal oil. In an embodiment, the raw material used to fill the voids in the meat analogue matrix may be a fat analogue (e.g., hydrocolloids, gellified emulsion of fat and protein), vegetable fibers, and/or connective tissue analogue (e.g., protein gum matrices which have a similar structure to meat connective tissues).

In some embodiments, the raw material and/or fat may comprise sea animal based ingredients such as shrimp, fish and krill. In other embodiments, sea animal based ingredients may be substantially or completely absent from the raw material and/or fat.

The raw material may include other components in addition to proteins and flours, for example one or more of a micronutrient, a vitamin, a mineral, an amino acid, a preservative, a colorant and a palatant.

Non-limiting examples of a suitable vitamin include vitamin A, any of the B vitamins, vitamin C, vitamin D, vitamin E, and vitamin K, including various salts, esters, or other derivatives of the foregoing. Non-limiting examples of a suitable mineral include calcium, phosphorous, potassium, sodium, iron, chloride, boron, copper, zinc, magnesium, manganese, iodine, selenium, and the like.

Non-limiting examples of a suitable preservative include potassium sorbate, sorbic acid, sodium methyl para-hydroxybenzoate, calcium propionate, propionic acid, and combinations thereof. Non-limiting examples of a suitable colorant include FD&C colors, such as blue no. 1, blue no. 2, green no. 3, red no. 3, red no. 40, yellow no. 5, yellow no. 6, and the like; natural colors, such as roasted malt flour, caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan. A non-limiting example of a suitable palatant is yeast. Non-limiting examples of suitable palatants include yeast, tallow, rendered animal meals (e.g., poultry, beef, lamb, and pork), flavor extracts or blends (e.g., grilled beef), animal digests, and the like.

The raw material may further include insoluble particles. The particles may include insoluble particles from non-animal origin for instance texturized vegetable proteins or micronized vegetable materials, hulls (for instance pea hulls), nuts, fibers (for instance carrot or wheat), calcium carbonate, and/or particles that yield strain softening which in turn accentuates the periodical instability. Non-limiting examples of suitable particle types are a pea hull, carrot fibers and calcium carbonate.

Insoluble particles or particles can have any shape or geometry, for example, insoluble particles or particles can be spherical, oval, ellipsoidal, cuboid, cylindrical, prism, pyramidal, conical, rhombohedral, scalenohedral, tetragonal, ditetragonal, trigonal, ditrigonal, hexagonal, dihexagonal, octahedron, tetrahexahedron, hexoctahedron, rhombic, disphenoid, trapezohedron, diploid, gyroid, tetartoid, pyritohedron, tetrahedron, hextetrahedron, or combinations thereof. Insoluble particles or particles can be particles with an aspect ratio of from 1 to 20, or fibers which generally have elongated and filamentous shapes.

In an embodiment, at least a portion of the insoluble particles comprise at least one mineral material selected from the group consisting of silicium, carbon and calcium.

In an embodiment, at least a portion of the insoluble particles comprise at least one mineral material selected from the group consisting of rhombohedral calcite, scalenohedral calcite, silicon dioxide, and magnesium oxide.

In an embodiment, at least a portion of the insoluble particles comprise at least one organic material selected from the group consisting of a bone meal, a cartilage meal, a ground crustacean shell, a ground sea fish shell, vegetable fiber, and a ground egg.

In an embodiment, at least a portion of the insoluble particles are selected from the group consisting of a gelled vegetable gum, a gelled hydrocolloid, a polymerized vegetable gum, a polymerized hydrocolloid, and mixtures thereof.

In an embodiment, the insoluble particles comprise a first portion that is calcium carbonate and a second portion that is heat resistant starch.

In an embodiment, the raw material may be processed into an emulsion. For example, an emulsion can be formed from meat, comprising natural meat materials (i.e., skeletal tissue and non-skeletal muscle) from one or more of mammals, fish or fowl, and/or meat by-products. The meat and/or meat by-products can be selected from a wide range of components, with the type and amount of meat material depending on a number of considerations, such as the intended use of the product, the desired flavor of the product, palatability, cost, availability of ingredients, and the like. The term meat material as used herein includes non-dehydrated meat and/or meat by-products, including frozen materials.

Additionally or alternatively to the meat, the emulsion may comprise one or more other proteinaceous materials, for example wheat gluten, soy flour, soy protein concentrate, soy protein isolate, egg albumin, or nonfat dry milk. If another proteinaceous material is included in the meat emulsion, the amount of the other proteinaceous material may vary from preferably about 5 wt. % to about 35 wt. % by weight of the emulsion, depending on such factors as the intended use of the product, the quality of meat material used in the emulsion, ingredient cost considerations, and the like. In a more preferred embodiment, the level of the other proteinaceous material is between about 25 wt. % and about 35 wt. % by weight, for example between about 28 wt. % and about 31 wt. % by weight. Generally, as the fat content and/or moisture content of the meat material used are increased, the level of other proteinaceous material in the emulsion is increased accordingly.

The formulation of the meat emulsion may vary widely, but nevertheless, the emulsion should have a protein to fat ratio sufficient to form a firm meat emulsion product upon coagulation of the protein with no sign of emulsion instability. The protein content of the emulsion should enable the emulsion, upon being heated to a temperature above the boiling point of water, to coagulate and form a firm emulsion product within about five minutes, or preferably within three minutes, after being heated to such a temperature. Thus, the meat materials, the dry proteinaceous material (if used) and any additives are mixed together in proportions such that the meat material is present in an amount between about 50 wt. % to about 75 wt. % by weight, or from about 60 wt. % to about 70 wt. % by weight of the meat emulsion. In one embodiment, the starting ingredients for the meat emulsion comprise about 29 wt. % to about 31 wt. % by weight protein and about 4 wt. % to about 9 wt. % by weight fat, for example about 4 wt. % to about 6 wt. % by weight fat. The resultant meat emulsion product should have a substantially similar profile to that of the starting ingredients; however, if gravy or broth is added to the product, this profile could change due to the moisture, protein and/or fat content of the gravy/broth.

In some embodiments, the meat emulsion is formulated to contain between about 45 wt. % and about 80 wt. % by weight moisture, or between about 49 wt. % and about 56 wt. % by weight of the meat emulsion, or between about 52 wt. % and about 56 wt. % by weight of the meat emulsion. The exact concentration of water in the emulsion depends on the amount of protein and fat in the emulsion.

In step 42, the raw material or emulsion (hereafter referred to as the raw material for brevity) may be transported by the system for further processing. In an embodiment, mixing processes for the raw material may be performed remotely relative to any extrusion and/or cutting process associated with the meat analogue extrusion system 40. Accordingly, the transportation step of step 42 may occur between any processing steps described herein and/or between any other processing steps known in the art. Locomotion of the raw material may occur through a tube. The tube may be manufactured from a metal and/or a plastic. Locomotion of the raw material through the tube may be performed by a pump, for example a screw pump, and/or by gravity.

In step 43, pressure may be applied to the raw material by the extruder 34 (e.g., a twin screw extruder), shown in FIG. 1. Referring again to FIG. 2, step 43 may include heating the raw material. Step 43 may further include moving the raw material from an inlet of the extruder 34 through an extrusion length of the extruder 34 and out of the extruder 34 into the die 10.

Step 43 of pressure application may further include injection step 44. Injection step 44 may include injection of water, one or more particle and/or one or more liquid ingredient. In an embodiment, the injection step 44 includes the injection of a fat and/or a material that has the appearance and/or properties of a fat. The injection of water, one or more particle and/or one or more liquid ingredient may occur while the raw material is moving along the extruder 34. In step 44 water and/or liquid may be injected into the extruder 34. The water, one or more particle and/or one or more liquid ingredient may mix with the raw material passing through the extruder 34.

In step 47, the raw material may be directed from the extruder 34 (e.g., a twin screw extruder) and into a die, for example the die 10. The raw material may be formed into a slab of raw material when forced through the die 10 by the extruder 34. In an embodiment, the die 10 includes holes for injecting a material into the raw material on a downstream end of the die 10. In an embodiment, step 45 includes the injection of a fat and/or a fat analogue. The fat and/or fat analogue may be injected to fill gaps between the fibrous macrostructure of the meat analogue. The size of the slab may be predetermined by adjusting the die 10 to a desired configuration.

Step 47 may optionally include steps 45 and 46. Step 45 may include injection of water, one or more particle and/or one or more liquid ingredient. The injection of water, one or more particle and/or one or more liquid ingredient may occur while the raw material is moving through the die 10.

Step 46 may include setting and/or maintaining a temperature of the die 10. The die 10 may contain one or more cooling lines (e.g., a plurality of cooling lines) integrated within the die 10 and connected to the one or more cooling devices 35. The one or more cooling devices 35 may direct a liquid through the one or more cooling lines of the die 10 to remove heat energy from the die 10. The die 10 may include a temperature sensor to sense the temperature of the die 10. The one or more cooling devices 35 may adjust a fluid flow rate and/or a fluid temperature in reply to and/or based on feedback received from the temperature sensor. In an embodiment, the flow rate may be adjusted by changing a speed of operation of the extruder 34 (e.g., a twin screw extruder). In an embodiment, multiple temperature sensors may be placed along the flow path of the raw material as the raw material moves through the die 10.

Step 48 may optionally be performed after the raw material has been directed through the die 10 to become a processed material. Step 48 may include cutting and/or molding the processed material using cutting and/or molding equipment. For example, cutting may include stamping the processed material to put the processed material into a substantially circular form associated with lunchmeat. As another example, the processed material may be directed into a mold to apply a shape to the processed material. For example, the processed material may be molded to the shape of a marbled beef steak. As another example, the processed material may be packaged, for example by directing the processed material into a plastic container and then sealing the plastic container with the processed material therein.

In some embodiments, the processed material may be additionally or otherwise post-processed. For example, a gravy may be prepared by heating a mixture of water, starch and condiments. The processed material and gravy can be filled into cans in the desired proportions to form a blended pet food, and the cans can be vacuum sealed and then retorted under time-temperature conditions sufficient to effect commercial sterilization. Conventional retorting procedures may be used, for example a retorting temperature of about 118° C. to 121° C. for approximately 40 to 90 minutes to produce a commercially sterile product.

For example, the chunks can be mixed with another comestible composition such as gravy (e.g., a starch and/or a gum in water), broth in which another comestible composition has been simmered, vegetables (e.g., potatoes, squash, zucchini, spinach, radishes, asparagus, tomatoes, cabbage, peas, carrots, spinach, corn, green beans, lima beans, broccoli, brussel sprouts, cauliflower, celery, cucumbers, turnips, yams and mixtures thereof), condiments (e.g., parsley, oregano, and/or spinach flakes), or kibbles.

Figure 3:
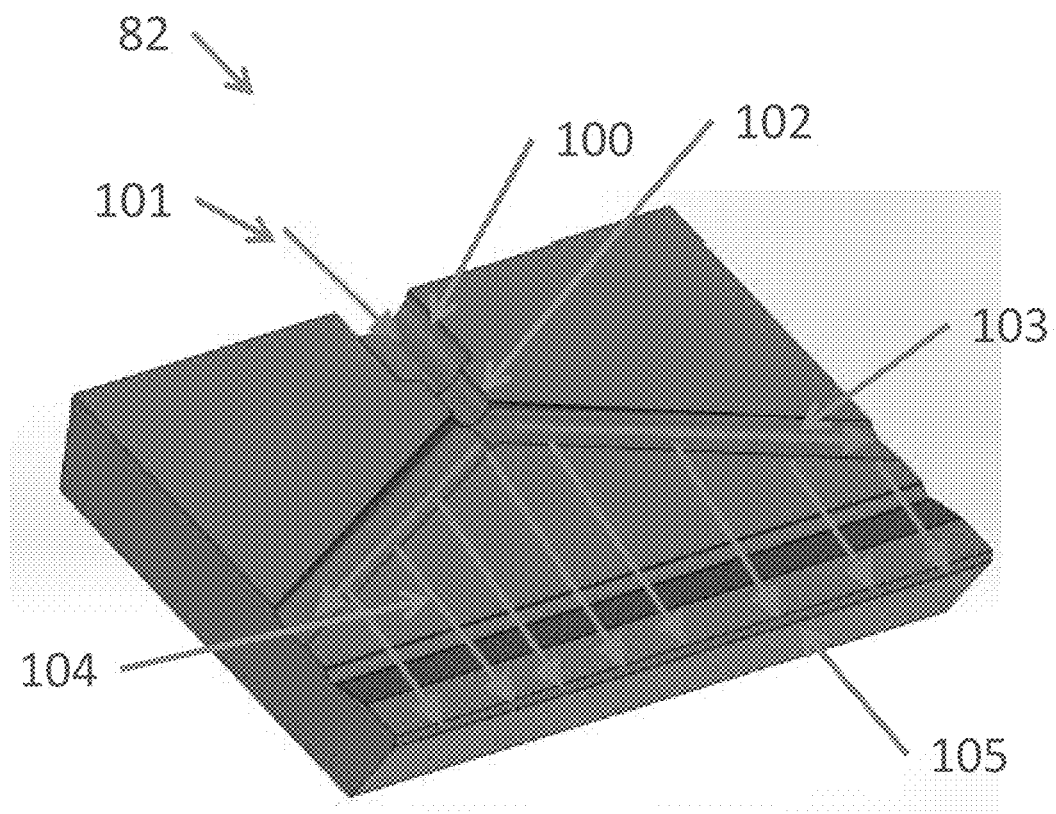
FIG. 3 illustrates an embodiment of a flow diagram of a meat analogue along a lower part of a die according to the present disclosure.

FIG. 3 illustrates an embodiment of direction of flow 101 of the dough 31 through the die 10. For illustrative purposes, a lower part 82 of the die 10 is shown. The direction of flow 101 shows how the dough 31 can move in the die 10 as the dough 31 moves from the extruder 34 (e.g., a twin screw extruder), into an analogue inlet 100, into a channel 103, and across an extrusion plane 104. The lower part 82 of the die 10 may further comprise an extrusion portion inlet 102 positioned between the analogue inlet 100 and the channel 103. The extrusion portion inlet 102 may reduce an area of the flow path of the dough 31 as the dough 31 moves from the analogue inlet 100 to the channel 103. The extrusion portion inlet 102 may provide a consistent diameter flow restriction prior to dough 31 entering the channel 103. For example, a connection positioned at the analogue inlet 100 may be of different sizes depending on the specific extruder used and/or the specific connection between an extruder and the die 10. Accordingly, a more consistent product may be achieved through the use of the extrusion portion inlet 102.

As the dough 31 enters the channel 103 from the extrusion portion inlet 102, the dough 31 may extend along the channel 103 as shown by the direction of flow 101 arrows. While not shown in FIG. 3, at the each end of the channel 103 the flow can be blocked by side portions of the die 10. When the dough 31 is blocked by the side portions, the dough 31 is forced (e.g., by the pressure from the extruder 34) across the extrusion plane 104 and over a die lip 105 as shown by the direction of flow 101 arrows. In a preferred embodiment, a cross sectional area of the flow path of the dough 31 in the channel 103 is greater than a cross sectional area of the flow path of the dough 31 across the extrusion plane 104.

A fat and/or a fat analogue may be injected into the dough 31 as the dough 31 moves through the die 10. While not shown in FIG. 3, the extrusion plane 104 and/or the die lip 105 may comprise one or more injection ports. The injection ports may be configured to inject the fat and/or the fat analogue into the dough 31. The fat may alternatively be injected through a slit immediately after the die exit. The geometry can be adapted to increase the void in between the fibers to optimize the fat injection in the slab.

Figure 4:
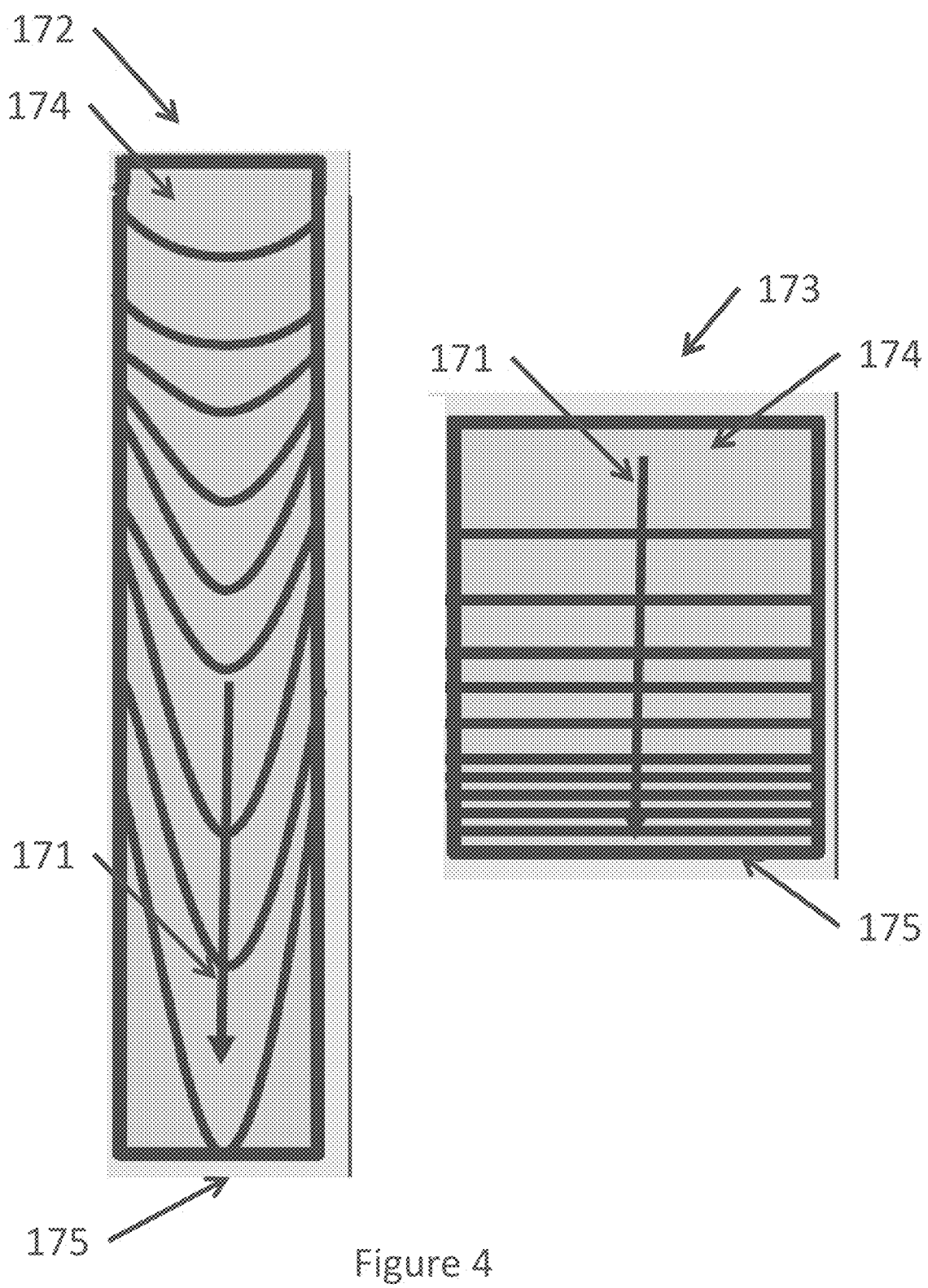
FIG. 4 illustrates an embodiment of a fiber creation orientation diagram according to the present disclosure.

FIG. 4 illustrates an embodiment of a fiber creation orientation diagram. In general, fiber creation orientation may change depending on the length of the die 10 as the dough 31 moves down the die 10 in a direction of flow 171. The lines shown on the cross section of the dies in FIG. 4 indicate a general orientation of fibers that may be created in the dough 31 and/or a velocity profile of the dough 31 as the dough 31 moves through the dies in FIG. 4. For example, in a traditional long-type die the fiber orientation may be as shown in diagram 172. In contrast to the die shown in diagram 172, the die 10 according to the embodiments disclosed herein, for example a short die, may have the general orientation of fibers and/or the velocity profile as shown in diagram 173.

Referring back to diagram 172, the fibers (as represented by the lines) and/or the velocity profile may be similar to a Hagen-Poiseuille flow distribution as the dough 31 moves from a die inlet 174 to a die outlet 175. Accordingly, the longer the distance from the die inlet 174 to the die outlet 175, the more the fibers become parallel to the direction of flow 171. However, in diagram 173, the fibers remain perpendicular to the direction of flow 171 from the die inlet 174 to the die outlet 175. Accordingly, the preferred embodiment of the die 10 according to the present disclosure (e.g., a short die) and the diagram 173 can achieve a more desirable and predictable manufacturing process using the dough 31.

The fibers may be created in the die 10 when the length of the die 10 and the pressure conditions of the dough 31 create a periodical flow instability in the die 10. The periodical flow instability may result in a periodical pressure oscillation. The pressure oscillation may occur at a particular shear rate and shear stress. When the pressure oscillation occurs, the dough 31, which may include a protein, may not be given time to relax. For example, an article entitled "Polymer Processing Extrusion Instabilities and Methods for their Elimination or Minimisation" by Agassant, J.-F. et al. published on polymer-process.com reviews findings related to instabilities in polymer processing. (Agassant, J.-F. et al., Polymer Processing Extrusion Instabilities and Methods for their Elimination or Minimisation, International Polymer Processing (XXI), 2006-3, at 239).

When the die 10 is a short die the dough 31 may not relax and therefore may retain the properties of the pressure oscillation. When the properties of the pressure oscillation are retained, a sheared fiber and gap structure may be created. The speed at which the dough 31 moves through the die 10 and the decompression of the dough 31 due to shear stress may influence the periodical instability of the dough 31 as it moves through the die 10.

For example, as the shear rate of the dough 31 increases, the shear stress of the dough 31 may generally also increase. At a relatively low shear rate, the shear stress is relatively low and the flow of the dough 31 through the die 10 may be generally laminar. In contrast, at a relatively high shear rate, the shear stress may be relatively high and the flow of the dough 31 through the die 10 may be generally grossly fractured or turbulent. However, at a shear rate between a relatively low and a relatively high shear rate, pressure oscillations may occur along the flow of the dough 31. When pressure oscillations occur, the dough 31 may expand along the direction of flow through the die 10 to form voids. The dough 10 that remains between the voids may become the fibers shown in FIG. 4. Thereafter, a fat and/or fat analogue may be injected into and/or otherwise introduced within the voids to substantially fill the voids.

In an embodiment, when the dough 31 is below a critical temperature, a phase separation of the dough 31 may occur. Therefore, the temperature of the dough 31 may be reduced while passing through the die 10. Further temperature reduction of the dough 31 may solidify the dough 31 and/or may set the structure of the dough 31. If the structure of the dough 31 is set during the phase separation of the dough 31, the dough 31 may retain a fibrous meat-like appearance including sheared fibers. In addition to temperature, flow output and viscosity of the dough 31 may change the properties of the fibers created in the dough 31.

FIG. 5 illustrates an embodiment of a processed food analogue 181 exiting from a die 10 with the sheared fibers 71 and gaps 72 between the sheared fibers 71, a "sheared fiber and gap structure." As described in reference to FIG. 4, the sheared fibers 71 that remain substantially perpendicular to a direction of flow 171 of the dough 31 are desirable when producing a meat analogue. As used herein, substantially perpendicular may include sheared fiber orientations that are about +/−15 degrees from a direction perpendicular to the direction of flow. In some embodiments, sheared fibers 71 that remain substantially perpendicular to the direction of flow 171 may be bounded by smaller fibers at other angles relative to the direction of flow. However, even when considering the smaller fibers as included in the sheared fibers 71, an average angle of the sheared fibers 71 with respect to the direction of flow 171 may remain substantially perpendicular to the direction of flow 171.

Figure 6:
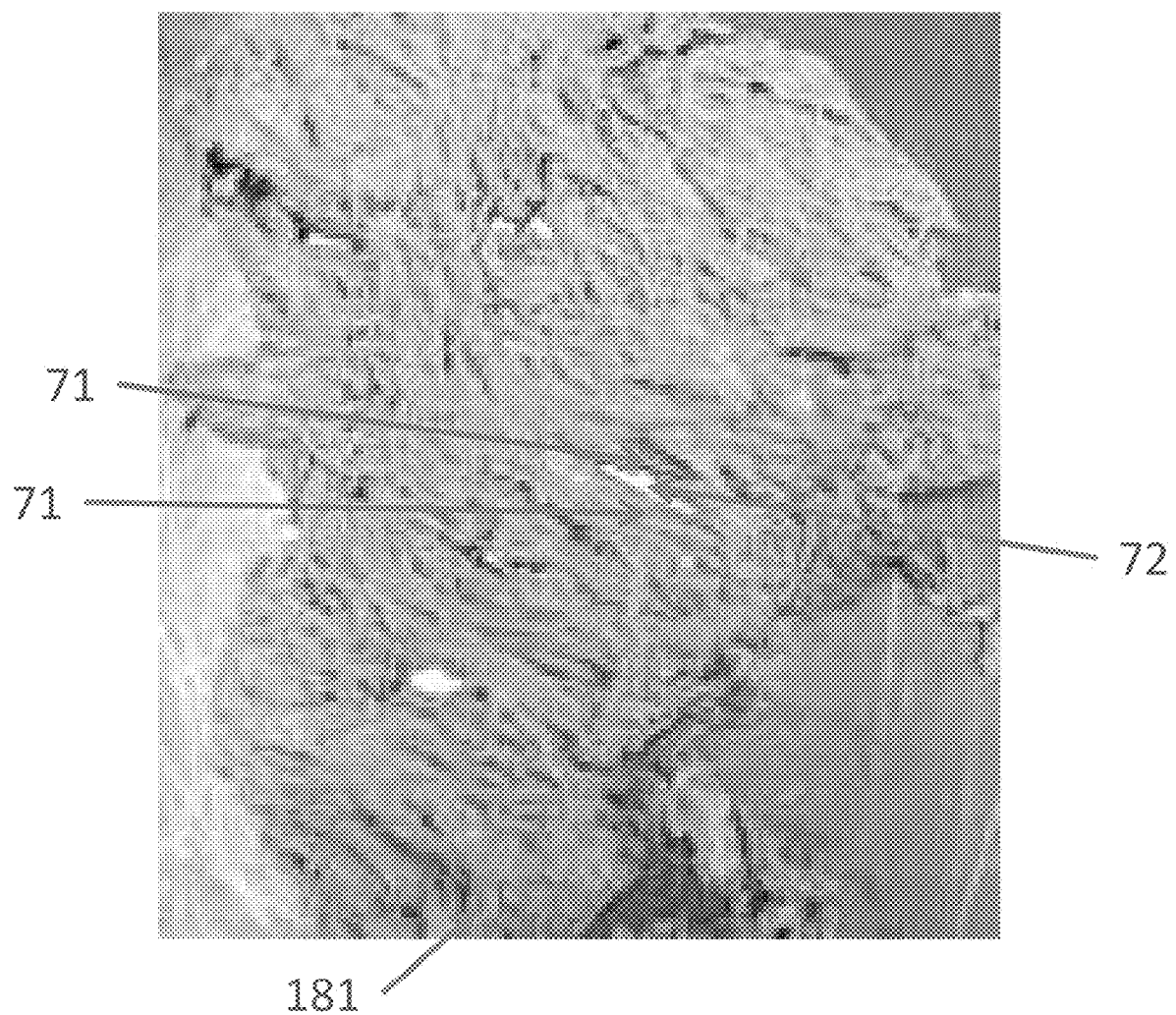
FIG. 6 illustrates an embodiment of a meat analogue with a sheared fiber and gap structure.

FIG. 6 illustrates an embodiment of a meat analogue with the sheared fiber and gap structure. In FIG. 6 the processed food analogue 181 has been removed from the die 10. The sheared fibers 71 and the gaps 72 between the sheared fibers are shown in the processed food analogue 181. FIG. 6 illustrates an embodiment of a substantially non-homogenous meat analogue structure.

Figure 7:
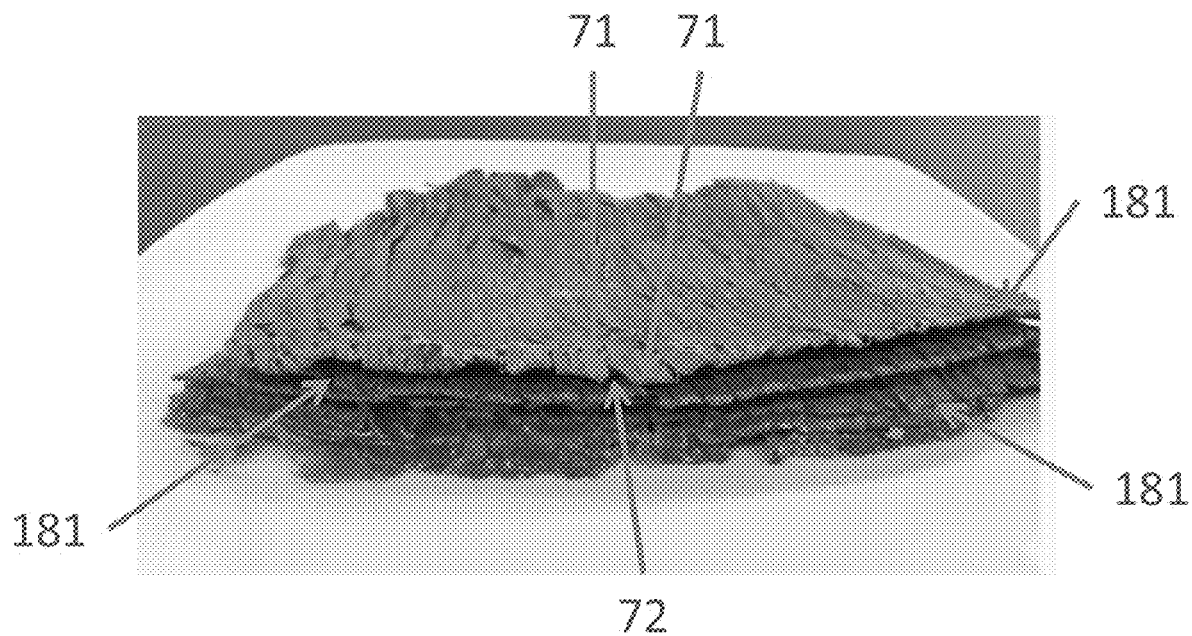
FIG. 7 illustrates stacked sheets of an embodiment of a meat analogue with a sheared fiber and gap structure.

FIG. 7 illustrates stacked sheets of an embodiment of a meat analogue with the sheared fiber and gap structure. In FIG. 7 the processed food analogue 181 has been removed from the die 10 and stacked. The sheared fibers 71 and the gaps 72 between the sheared fibers are shown in the processed food analogue 181. In some embodiments, the stacked sheets of the meat analogue with the sheared fiber and gap structure may be immersed into a fat and/or fat analogue. In some embodiments, the meat analogue with the sheared fiber and gap structure may be immersed in and/or sprayed with the fat and/or fat analogue. In either and/or both cases, the fat may fill the voids of the gap structure in the meat analogue to yield a marbled meat analogue. Such processes may be used in conjunction with and as an alternative to fat injection processes.

Figure 8:
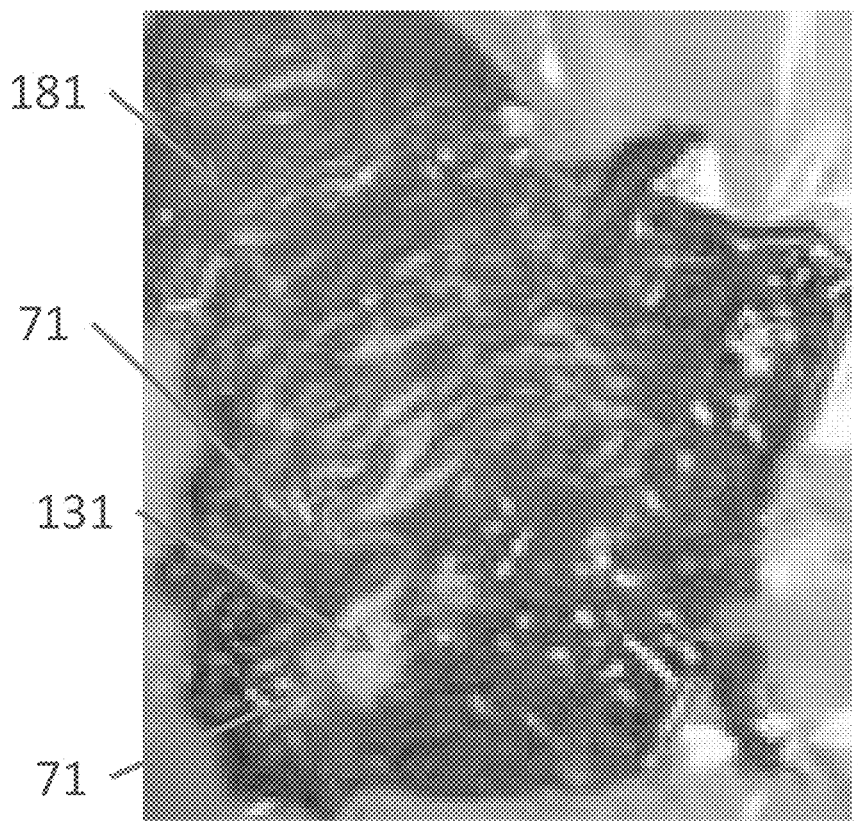
FIG. 8 illustrates an embodiment of a meat analogue with a sheared fiber and gap structure where a fat has been injected to fill the gaps between the sheared fibers.

FIG. 8 illustrates an embodiment of a meat analogue with the sheared fiber and gap structure where a fat 131 has been injected to fill the gaps between the sheared fibers. FIG. 8 illustrates an embodiment of a substantially steak-like color and shape. The fat 131 may be a high melting point fat and/or fat analogue. The fat 131 may fill the gaps 72 created by the flow instability of the dough 31 as the dough 31 moves through the die 10. The processed food analogue 181 including the fat 131 in the gaps 72 may improve mouthfeel perception for a consumer when compared to the processed food analogue 181 without the inclusion of the fat 131.

For example, the die 10 may include fat injection sites in the die 10 that inject the fat or the fat analogue into the dough 31 as the dough 31 moves through the die 10 to yield visually distinct regions of (1) a fat and/or fat analogue and (2) an animal protein in the processed food analogue 181. In such an embodiment, the visually distinct regions are connected but not substantially mixed. For example, substantially all or completely all of the animal protein can be confined to one or more visually distinct regions of the analogue (e.g., a body and/or macrostructure of the analogue), and/or substantially or completely all of the injected fat can be confined to one or more other visually distinct regions of the analogue (e.g., within one or more gaps in the body of the analogue). As shown in FIG. 8, the meat analogue with the sheared fiber and gap structure where the fat 131 has been injected to fill the gaps may create a plurality of alternating, visually distinct regions (i.e., fat, macrostructure, fat, macrostructure, etc.) in the meat analogue. The fat injection sites may further inject lard and/or tallow flavor in addition to the fat and/or the fat analogue to optimize meat flavor release in the mouth of a consumer.

FIG. 9 illustrates an additional or alternative embodiment of a meat analogue with the sheared fiber and gap structure. FIG. 9 illustrates an embodiment of a processed food analogue 181 exiting from a die 10 with the sheared fibers 71 and gaps 72 between the sheared fibers 71. As described in reference to FIGS. 4 and 5, the sheared fibers 71 that remain substantially perpendicular to a direction of flow 171 of the dough 31 are desirable when producing a meat analogue.

Figure 10:
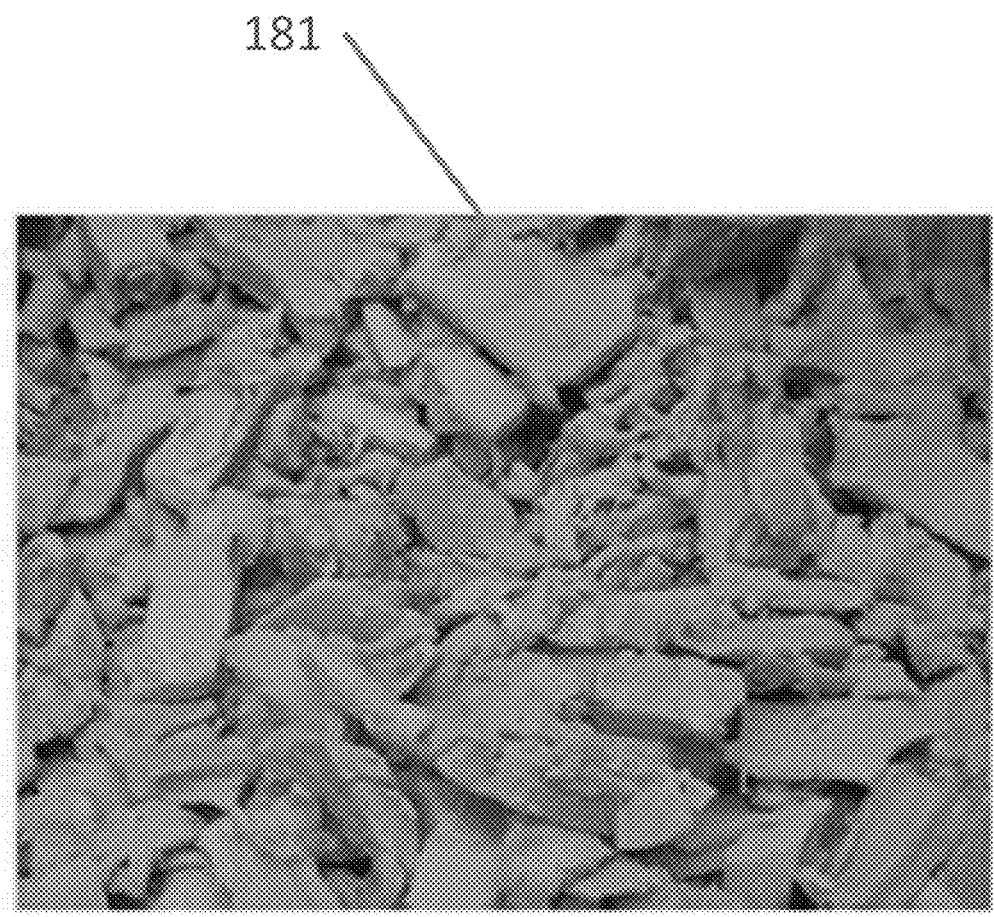
FIG. 10 illustrates a meat analogue with a compact homogeneous structure.

FIG. 10 illustrates a meat analogue with an undesirable compact, substantially homogeneous structure. In contrast, preferred embodiments of the meat analogue comprise a non-homogenous structure with a fiber-like appearance. The meat analogue in FIG. 10 has been cut after passing through a cooling die that is not a short cooling die. Notably, there is no sheared fiber and gap structure in the embodiment of a meat analogue according to FIG. 10.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims. Further, the present embodiments are thus not to be limited to the precise details of methodology or construction set forth above as such variations and modification are intended to be included within the scope of the present disclosure. Moreover, unless specifically stated, any use of the terms first, second, etc. do not denote any order or importance, but rather the terms first, second, etc. are merely used to distinguish one element from another.

What is claimed is:

1. A meat analogue comprising:
a macrostructure of connected sheared fibers oriented substantially parallel to one another, wherein the macrostructure comprises meat, and further comprises an added insoluble particle; and
gaps positioned between the sheared fibers, wherein the gaps extend completely through the macrostructure, from a first side of the meat analogue to a second side of the meat analogue which is opposite from the first side, as channels connecting the first side to the second side.

2. The meat analogue according to claim 1, wherein the gaps have been injected with a fat such that the meat analogue comprises a plurality of alternating visually distinct regions, the visually distinct regions comprising one or more first visually distinct regions comprising the fat and one or more second visually distinct regions comprising the macrostructure.

3. The meat analogue according to claim 1, wherein the gaps have been injected with a fat analogue that has an appearance and/or properties of a fat and is at least one of (i) a composition comprising hydrocolloids or (ii) a gellified emulsion of fat and protein, such that the meat analogue comprises a plurality of alternating visually distinct regions, the visually distinct regions comprising one or more first visually distinct regions comprising the fat analogue and one or more second visually distinct regions comprising the macrostructure.

4. The meat analogue according to claim 1, wherein the gaps have been immersed in a fat such that the meat analogue comprises a plurality of alternating visually distinct regions, the visually distinct regions comprising one or more first visually distinct regions comprising the fat and one or more second visually distinct regions comprising the macrostructure.

5. The meat analogue according to claim 1, wherein the added insoluble particle comprises micronized vegetable matter, wherein the micronized vegetable matter is selected from the group consisting of hulls, fiber and mixtures thereof.

6. The meat analogue according to claim 1, wherein the meat analogue resembles a marbled meat.

7. The meat analogue according to claim 1, wherein the macrostructure is a non-homogenous structure.

8. The meat analogue according to claim 1, wherein the meat analogue is a wet food composition.

9. The meat analogue according to claim 1, wherein the meat analogue contains gluten.

* * * * *